B. BROWER.
MOTOR VEHICLE.
APPLICATION FILED MAY 23, 1906.
907,104.
Patented Dec. 15, 1908.
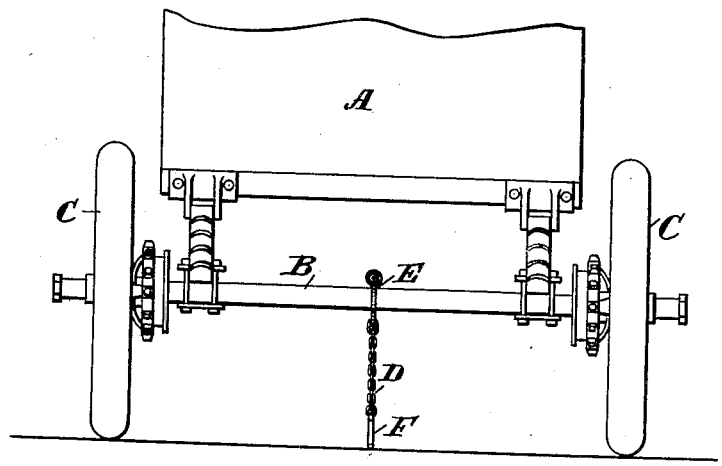
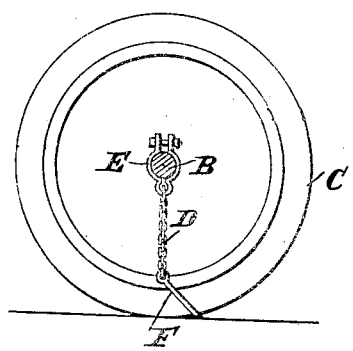
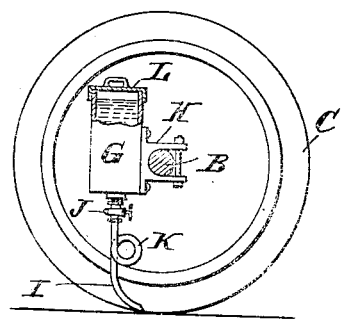
Attest:
J. A. Graves
G. Galiani
Inventor:
Bloomfield Brower
by his Att'ys
Philipp Sawyer Rice & Kennedy

UNITED STATES PATENT OFFICE.

BLOOMFIELD BROWER, OF NEW YORK, N. Y., ASSIGNOR OF ONE-HALF TO THEODORE A. WEBER, OF NEW YORK, N. Y.

MOTOR-VEHICLE.

No. 907,104.  Specification of Letters Patent.  Patented Dec. 15, 1908.

Application filed May 23, 1906. Serial No. 318,309.

*To all whom it may concern:*

Be it known that I, BLOOMFIELD BROWER, a citizen of the United States, residing at New York city, county of New York, and State of New York, have invented certain new and useful Improvements in Motor-Vehicles, fully described and represented in the following specification and the accompanying drawings, forming a part of the same.

This invention relates to improvements in those motor vehicles, the wheels of which are provided with rubber tires. Such tires not only perform their intended function of cushioning the wheels of the vehicle but also have the effect of electrically insulating the vehicle from the ground, and this insulation, I have discovered, results, while the vehicle is in motion, in certain injurious effects to the occupants of the vehicle, which it is the object of the present invention to obviate.

While a rubber-tired vehicle is in motion, particularly if it be moving at a very rapid pace, a large amount of electricity is generated in the vehicle, due to its movement, and, possibly also, to its vibration, and from the same causes electricity may be said to be generated in the body of the occupants. As the vehicle is insulated by means of its rubber tires, there is no outlet for the discharge from the vehicle of the electricity so generated, and, as a result, the electricity generated in the vehicle itself is transmitted to the occupants of the vehicle, and particularly the occupant who happens to be at the time chauffeur, and who is, therefore, more directly in contact with the metal parts of the vehicle. Electricity so generated in and transmitted to the body of the occupants I have discovered has a very serious effect upon the nervous system of the occupants, and particularly the chauffeur, in that, according to my observation, a high nervous tension or strain is developed in the occupants of the vehicle which not only produces bodily fatigue continuing long after the occupants leave the vehicle, but also produces what may be described as a mental restlessness and recklessness, which may, and probably will, permanently affect the health of the occupants, and which is, I believe, responsible for many of the automobile accidents, because such a mental condition naturally must upset the judgment of the chauffeur in the driving and manipulation of the vehicle. I have discovered that this very serious difficulty may be entirely remedied in these rubber-tired motor-vehicles by electrically connecting such vehicles with the ground so that electricity generated therein or in the occupants by the movement of the vehicle or its vibration may be discharged into the ground and the occupants of the vehicle thereby relieved entirely from its ill effects. Many different methods of so electrically connecting the vehicle with the ground may be resorted to, but the methods which I prefer and which I have found effective in practice are those illustrated in the accompanying drawing, in which—

Figure 1 is a rear view of an automobile provided with one such means for electrically connecting it with the ground. Fig. 2 is a section of the same taken through the rear axle; and Fig. 3 illustrates a modification which will be hereinafter described.

Referring to said drawing, A represents an automobile body, B its axle, and C the rubber tires of its wheels. The means for electrically connecting the automobile with the ground for the purposes of this invention consists of a metal chain D secured at its upper end by a metal clip E to the axle B and provided at its lower end with a metal trailer F consisting preferably of a steel rod of about three-quarters of an inch in diameter. The lower end of this trailer F is preferably hardened and also tapered so as to insure good contact between it and the ground should the latter be hard. To avoid rattling of the chain D, its links may be tied together, if desired, in such a way to prevent such rattling and at the same time preserve the necessary flexibility of the chain, so that it may yield and maintain contact between the trailer and the ground no matter in what direction the vehicle be moved. When a motor vehicle is so electrically connected to the ground by a chain and trailer D, F, the occupants of the vehicle are, according to my observation, entirely relieved from the ill effects of electricity generated in the vehicle, such electricity being discharged from the vehicle into the ground through the circuit provided by the chain and trailer D, F connecting the axle of the vehicle with the ground. Means trailing along the ground, like trailer F, while the vehicle is moving, is preferred because I have reason to believe that with such a trailing contact the best results are obtained.

In the modification illustrated in Fig. 3, a water tank G is employed which is connected by a metal clip H with the axle of the vehicle and is provided at its lower end with a tube 1 having a cock J for regulating the flow of the water therethrough from the tank G. The lower end of this tube 1 is designed to trail along the ground, and, in order to permit it to yieldingly engage the ground and to yield when passing over an obstruction upon the ground, it is provided with a coil K about midway of its length, the tubing also being made, in whole or in part, of sections permitting it to swing in all directions, like the chain and trailer D, F of Figs. 1 and 2. The tank G is provided with a removable cover L for preventing the entrance of dirt, dust, etc. In some cases such construction as this may be preferred over that illustrated in Figs. 1 and 2 for the reason that not only is a metallic circuit (consisting of the clip H, tank G and tube I) provided between the vehicle axle and the ground, but a circuit consisting of running water, which may be more effective in providing for the rapid discharge of the electricity generated in the vehicle.

As before indicated, many modifications and changes may be made in the circuit employed for connecting the vehicle with ground without departing from the spirit of the present invention. It is also to be understood that wherever reference is made to rubber tires, it is intended to include tires of other materials which, like rubber, have the effect of electrically insulating the motor vehicle from the ground.

What I claim:—

1. The combination with a motor vehicle electrically insulated from the ground, of means for electrically connecting it with the ground for the discharge of electricity generated in the vehicle.

2. The combination with a motor vehicle electrically insulated from the ground, of means connected with the vehicle and adapted to yieldingly engage the ground for the purpose of electrically connecting the vehicle with the ground.

3. The combination with a motor vehicle electrically insulated from the ground, of means connected with the vehicle and adapted to yieldingly engage the ground in all directions in which the vehicle may be moved for the purpose of electrically connecting the vehicle with the ground.

4. The combination with a motor vehicle electrically insulated from the ground, of means connected with the vehicle and adapted to trail along the ground for the purpose of electrically connecting the vehicle with the ground.

In testimony whereof, I have hereunto set my hand, in the presence of two subscribing witnesses.

BLOOMFIELD BROWER.

Witnesses:
E. F. J. GREBLE,
J. A. GRAVES.